(12) United States Patent
Hwang et al.

(10) Patent No.: US 11,581,101 B2
(45) Date of Patent: Feb. 14, 2023

(54) METHOD FOR DECOMMISSIONING NUCLEAR FACILITIES

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 107 days.

(21) Appl. No.: 17/048,332

(22) PCT Filed: Apr. 18, 2019

(86) PCT No.: PCT/KR2019/004664
§ 371 (c)(1),
(2) Date: Oct. 16, 2020

(87) PCT Pub. No.: WO2019/203581
PCT Pub. Date: Oct. 24, 2019

(65) Prior Publication Data
US 2021/0158984 A1    May 27, 2021

(30) Foreign Application Priority Data
Apr. 19, 2018 (KR) .......... 10-2018-0045648

(51) Int. Cl.
G21D 1/00 (2006.01)
(52) U.S. Cl.
CPC ................. *G21D 1/003* (2013.01)

(58) Field of Classification Search
CPC ................. G21D 1/003; G21F 9/30
See application file for complete search history.

(56) References Cited

U.S. PATENT DOCUMENTS

| | | | | |
|---|---|---|---|---|
| 2,716,705 A | * | 8/1955 | Zinn | G21C 11/026 376/288 |
| 3,755,079 A | * | 8/1973 | Weinstein | G21C 13/00 976/DIG. 293 |
| 5,754,612 A | * | 5/1998 | Gou | G21C 1/084 376/205 |

(Continued)

FOREIGN PATENT DOCUMENTS

| | | |
|---|---|---|
| ES | 2218816 | 11/2004 |
| JP | 59-023298 | 2/1984 |
| JP | 2-307097 | 12/1990 |

(Continued)

OTHER PUBLICATIONS

EPO, European Search Report of EP 19788359.8 dated Jan. 4, 2022.
EPO, Communication pursuant to Rules 70(2) and 70a(2) EPC of EP 19788359.8 dated Jan. 21, 2022.

*Primary Examiner* — Jack W Keith
*Assistant Examiner* — Joshua C Devorkin
(74) *Attorney, Agent, or Firm* — Lex IP Meister, PLLC

(57) ABSTRACT

A method of decommissioning a nuclear facility including a plurality of sandboxes that cover a plurality of upper penetration holes, includes: exposing the plurality of pipes through the plurality of upper penetration holes by removing the plurality of sandboxes; and cutting the plurality of pipes through the plurality of upper penetration holes.

5 Claims, 5 Drawing Sheets

(56) References Cited

U.S. PATENT DOCUMENTS

2003/0141461 A1 7/2003 Novak et al.
2011/0255650 A1 10/2011 McDaniel

FOREIGN PATENT DOCUMENTS

| JP | 04-158297 | | 6/1992 |
|----|-----------|---|--------|
| JP | 4-158297 | | 6/1992 |
| JP | 04158297 | * | 6/1992 |
| JP | 1995-218696 | | 8/1995 |
| JP | 3565371 | | 9/2004 |
| JP | 2016-114486 | | 6/2016 |
| KR | 10-1662588 | | 10/2016 |

* cited by examiner

METHOD FOR DECOMMISSIONING NUCLEAR FACILITIES

TECHNICAL FIELD

The present disclosure relates to a method for decommissioning a nuclear facility.

BACKGROUND ART

In general, among nuclear facilities used for nuclear power generation, a pressurized light water reactor type of nuclear power plant includes a reactor pressure vessel and a cavity in which the reactor pressure vessel is positioned, and includes biological shield concrete surrounding the reactor pressure vessel.

In decommissioning of a nuclear facility, it is necessary to expand a space above the cavity to secure a working space in order to easily separate the reactor pressure vessel from the biological shield concrete.

DISCLOSURE

Technical Problem

An exemplary embodiment provides a method for decommissioning a nuclear facility, which can easily cut pipes that are directly connected with a nuclear pressure vessel and surrounded by a biological shield concrete.

Technical Solution

One aspect of the present invention provides a method for decommissioning a nuclear facility that includes a nuclear reactor pressure vessel, a plurality of pipes that are directly connected to the nuclear reactor pressure vessel, biological shield concrete that surrounds the plurality of pipes and the nuclear pressure vessel and includes a plurality of upper penetration holes that overlap the plurality of pipes, and a plurality of sandboxes that cover the plurality of upper penetration holes. The method includes: exposing the plurality of pipes through the plurality of upper penetration holes by removing the plurality of sandboxes; and cutting the plurality of pipes through the plurality of upper penetration holes.

The exposing the plurality of upper penetration holes may be carried out by removing a sealant that seals between the plurality of sandboxes and the upper portion of the biological shield concrete, and separating the plurality of sandboxes from the plurality of upper penetration holes.

The plurality of upper penetration holes may completely expose the plurality of pipes in a width direction.

The cutting the plurality of pipes may be carried out by cutting the plurality of pipes in the width direction by using a wire saw or a circular saw.

The method for decommissioning the nuclear facility may further include separating the nuclear pressure vessel from the biological shield concrete.

The nuclear reactor pressure vessel may be a pressurized water reactor.

Advantageous Effects

According to the exemplary embodiment, a method for decommissioning a nuclear facility that can easily cut pipes that are directly connected to a nuclear pressure vessel and surrounded by a biological shield concrete can be provided.

MODE FOR INVENTION

Hereinafter, an exemplary embodiment of the present invention will be described in detail with reference to the accompanying drawing so that a person of ordinary skill in the art to which the present invention belongs can easily implement it.

The present invention may be implemented in various different forms and is not limited to an exemplary embodiment described herein.

In addition, unless explicitly described to the contrary, the word "comprise", and variations such as "comprises" or "comprising" will be understood to imply the inclusion of stated elements but not the exclusion of any other elements.

Hereinafter, referring to FIG. 1 to FIG. 5, a decommissioning method of a nuclear facility according to an exemplary embodiment will be described.

Hereinafter, a pressurized water reactor (PWR) type of nuclear power plant will be described as an example of a nuclear facility, but this is not restrictive, and the nuclear facility may be a boiling water reactor (BWR) type of nuclear power plant.

The PWR-type nuclear power plant uses light water as a coolant and a moderator, and uses uranium 235 concentrated to about 2% to 4% as nuclear fuel.

The PWR-type nuclear power plant may be divided into a facility related to the nuclear reactor system that sends heat generated by nuclear fission within the reactor to a steam generator for heat exchange, and a facility related to a turbine and a generator system which turns the turbine with the steam generated from the steam generator and condenses the steam to water through a condenser and then the water is circulated back to the steam generator.

In general, a coolant (light water), which is a heat transfer medium of a nuclear reactor system, is heated to about 320° C. in a nuclear reactor and pressurized to about 153 atmospheres so that it does not boil.

A device that forms the system includes a pressurizer that adjusts pressure to maintain constant enthalpy, and a coolant pump that circulates the coolant between the reactor and the steam generator.

The system in which the steam generated from the steam generator rotates the turbine and generates power from the generator connected to the turbine shaft may be the same as the principle of a general thermal power plant.

Figure 1:
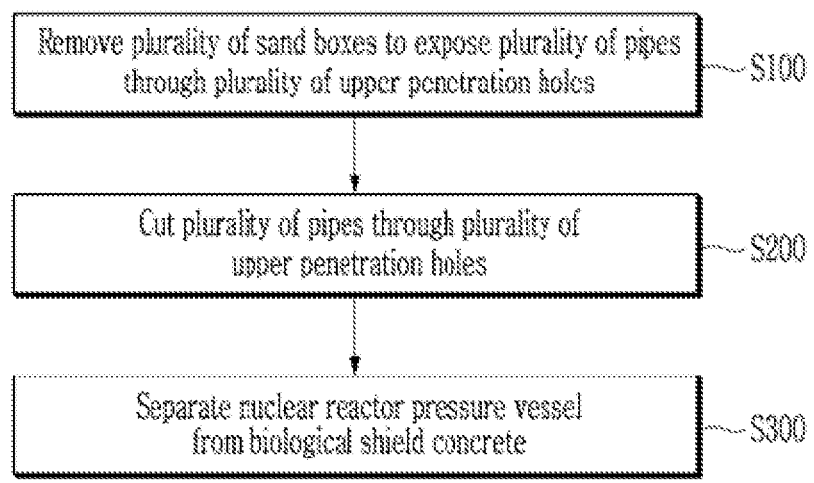
FIG. 1 is a flowchart of a decommission method of a nuclear facility according to an exemplary embodiment.

FIG. 1 is a flowchart of a decommission method of a nuclear facility according to an exemplary embodiment.

FIG. 2 to FIG. 5 are provided for description of the decommission method of the nuclear facility according to the exemplary embodiment.

Figure 2:
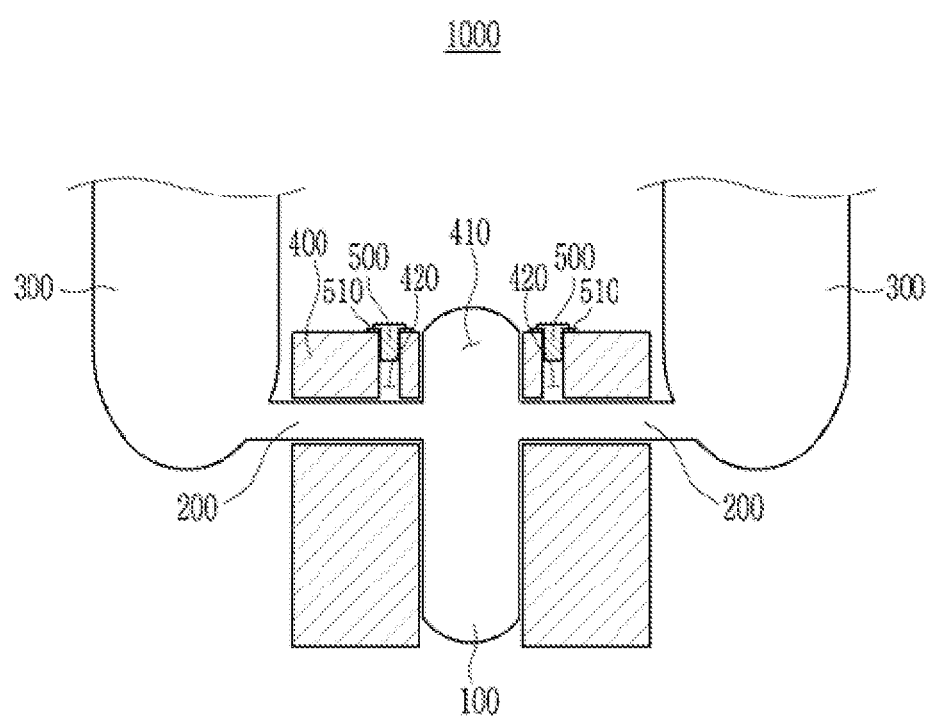
FIG. 2 to FIG. 5 are provided for description of the decommission method of the nuclear facility according to the exemplary embodiment.
Figure 3:
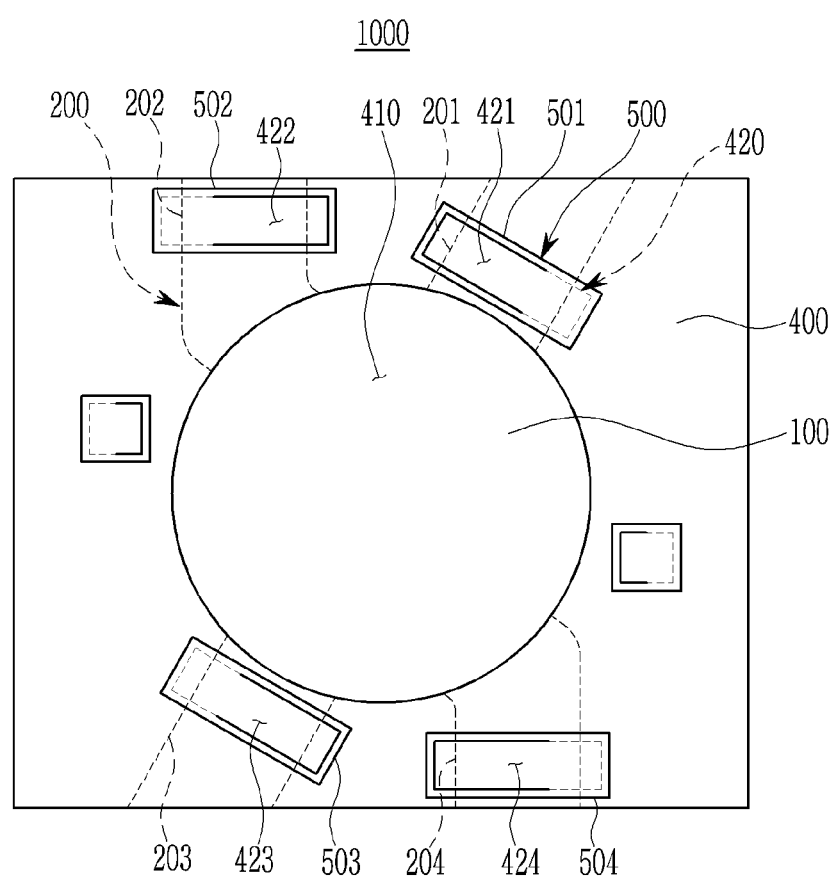

First, referring to FIG. 1 to FIG. 3, a plurality of pipes 200 are exposed through a plurality of upper penetration holes 420 by removing a plurality of sandboxes 500 (S100).

FIG. 2 shows a nuclear facility.

Specifically, referring to FIG. 2, a nuclear facility 1000 includes a nuclear reactor pressure vessel 100, a plurality of pipes 200 that are directly connected with the nuclear reactor pressure vessel 100, steam generators 300 that are connected with the nuclear reactor pressure vessel 100 through the pipes 200, biological shield concrete 400 that support the nuclear reactor pressure vessel 100 while surrounding the nuclear reactor pressure vessel 100 and the pipes 200, and a plurality of sandboxes 500.

The nuclear reactor pressure vessel 100 may be a pressurized light-water reactor, but this is not restrictive.

For example, the nuclear reactor pressure vessel 100 may be a boiling water reactor.

The nuclear facility 1000 may be formed in various shapes when it includes the nuclear reactor pressure vessel 100, the pipes 200, the biological shield concrete 400, and the sandboxes 500.

The biological shield concrete 400 includes a cavity where the nuclear reactor pressure vessel 100 is located, and a plurality of upper penetration holes 420 that expose the pipes 200 by overlapping the pipes 200.

The upper penetration holes 420 of the biological shield concrete 400 may correspond to welding portions between the pipes 200 and nozzles of the nuclear reactor pressure vessel 100, but this is not restrictive.

The sandboxes 500 cover the upper penetration holes 420.

The sandboxes 500 may have a box shape filled with sand, but is not limited thereto.

An upper flange to be supported on an upper portion of the biological shield concrete 400 of the sandboxes 500 may be included, and the upper flange may be supported on the upper portion of the biological shield concrete 400.

The sandboxes 500 are supported on the upper portion of the biological shield concrete 400, and sealants 510 may be provided between the sandboxes 500 and the upper portions of the biological shield concrete 400.

The sandbox 500 may be a structure for easily checking the integrity of the pipe 200 that is directly connected to the nuclear reactor pressure vessel 100.

For example, when the operation of the nuclear facility 1000 is stopped, the sandboxes 500 are separated from the upper penetration holes 420 of the biological shield concrete 400, and the integrity of the pipes 200 exposed by the upper penetration holes 420 can be checked.

The above described nuclear reactor pressure vessel 100, the pipes 200, the steam generator 300, the biological shield concrete 400, and the sandboxes 500 may be disposed in a containment vessel.

FIG. 3 shows the upper portion of the biological shield concrete of the nuclear facility.

Referring to FIG. 3, the pipes 200 connected to the nuclear reactor pressure vessel 100 that is disposed in the cavity 420 of the biological shield concrete 400 include a first pipe 201, a second pipe 202, a third pipe 203, and a fourth pipe 204

The first pipe 201 and the second pipe 202 are connected with one steam generator, and the third pipe 203 and the fourth pipe 204 are connected with another steam generator.

Hot water may pass through the first pipe 201 and the third pipe 203, and cold water may pass through the second pipe 202 and the fourth pipe 204, but this is not restrictive.

The upper penetration holes 420 of the biological shield concrete 400 are separated from each other in the upper portion of the biological shield concrete 400.

The upper penetration hole 420 has a quadrangular shape on a plane.

The upper penetration holes 420 includes a first upper penetration hole 421, a second upper penetration hole 422, a third upper penetration hole 423, and a fourth upper penetration hole 424.

The first upper penetration hole 421 exposes the first pipe 201 by overlapping the first pipe 201.

The second upper penetration hole 422 exposes the second pipe 202 by overlapping the second pipe 202.

The third upper penetration hole 423 exposes the third pipe 203 by overlapping the third pipe 203.

The fourth upper penetration hole 424 exposes the fourth pipe 204 by overlapping the fourth pipe 204.

The upper penetration holes 420 completely expose the pipes 200 in the width direction of each pipe.

Specifically, the first upper penetration hole 421, the second upper penetration hole 422, the third upper penetration hole 423, and the fourth upper penetration hole 424 respectively completely expose the first pipe 201, the second pipe 202, the third pipe 203, and the fourth pipe 204 respectively in width directions of the respective pipes.

The sandboxes 500 are separated from each other in the upper portion of the biological shield concrete 400.

The sandbox 500 has a quadrangular shape on a plane.

The sandboxes 500 include a first sandbox 501, a second sandbox 502, a third sandbox 503, and a fourth sandbox 504.

The first sandbox 501 is disposed inside the first upper penetration hole 421 and covers the first upper penetration hole 421.

The second sandbox 502 is disposed inside the second upper penetration hole 422 and covers the second upper penetration hole 422.

The third sandbox 503 is disposed inside the third upper penetration hole 423 and covers the third upper penetration hole 423.

The fourth sandbox 504 is disposed inside the fourth upper penetration hole 424 and overs the fourth upper penetration hole 424.

Each of the first sandbox 501, the second sandbox 502, the third sandbox 503, and the fourth sandbox 504 may be a structure for determining integrity of each of the first pipe 201, the second pipe 202, the third pipe 203, and the fourth pipe 204.

For example, when the operation of the nuclear facility 1000 is stopped, the first sandbox 501, the second sandbox 502, the third sandbox 503, and the fourth sandbox 504 are respectively separated from the first upper penetration hole 421, the second upper penetration hole 422, the third upper penetration hole 423, and the fourth upper penetration hole 424 of the biological shield concrete 400, and integrity of each of the first pipe 201, the second pipe 202, the third pipe 203, and the fourth pipe 204, which are respectively exposed by the first upper penetration hole 421, the second upper penetration hole 422, the third upper penetration hole 423, and the fourth upper penetration hole 424, can be determined.

First, for decommissioning of the nuclear facility 1000, the plurality of sandboxes 500, which are the first sandbox 501, the second sandbox 502, the third sandbox 503, and the fourth sandbox 504 are respectively separated from the plurality of upper penetration holes 420, which are the first upper penetration hole 421, the second upper penetration hole 422, the third upper penetration hole 423, and the fourth upper penetration hole 424.

In this case, the sealant provided between the sandboxes 500 and the biological shield concrete 400 is removed.

Thus, the plurality of upper penetration holes 420, which are the first upper penetration hole 421, the second upper penetration hole 422, the third upper penetration hole 423, and the fourth upper penetration hole 424, are exposed, and the first pipe 201, the second pipe 202, the third pipe 203, and the fourth pipe 204 are respectively exposed through the first upper penetration hole 421, the second upper penetration hole 422, third upper penetration hole 423, and fourth upper penetration hole 424.

The first pipe 201, the second pipe 202, the third pipe 203, and the fourth pipe 204 are completely exposed in width directions of the respective pipes through the first upper penetration hole 421, the second upper penetration hole 422, the third upper penetration hole 423, and the fourth upper penetration hole 424.

Figure 4:
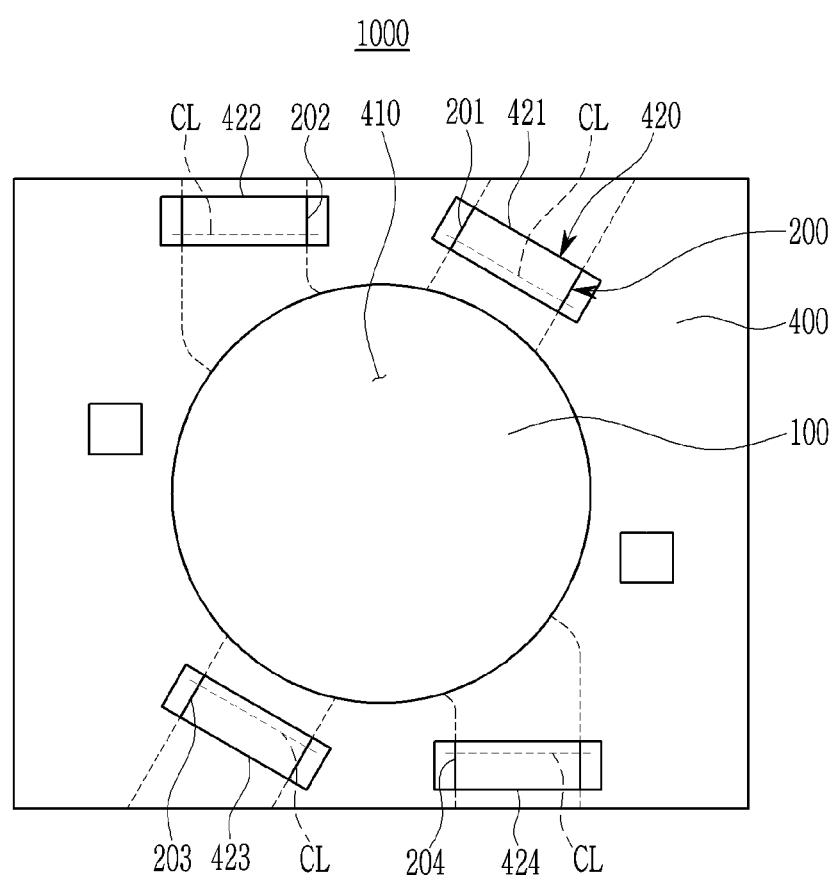

Next, referring to FIG. 4, the plurality of pipes 200 exposed through the plurality of upper penetration holes 420 are cut (S200).

Specifically, the pipes 200 completely exposed in the width direction through the upper penetration holes 420 are cut along virtual cut lines CL extending in the width direction of the pipes 200.

The first pipe 201 exposed through the first upper penetration holes 4201 is cut along a cut ling CL extending in a width direction of the first pipe 201, the second pipe 202 exposed through the second upper penetration hole 422 is cut along a cut ling CL extending in a width direction of the second pipe 202, the third pipe 203 exposed through the third upper penetration hole 423 is cut along a cut line CL extending in a width direction of the third pipe 203, and the fourth pipe 204 exposed through the fourth upper penetration hole 424 is cut along a cut line CL extending in a width direction of the fourth pipe 204.

The pipes 200 may be cut using a wire saw, but the present invention is not limited thereto, and the pipes 200 may be cut using other cutting means such as a circular saw and the like.

Since the pipes 200 are completely exposed through the upper penetration holes 420 in the width direction, the pipes 200 can be easily cut through the upper penetration holes 420 by using a cutting means.

Figure 5:
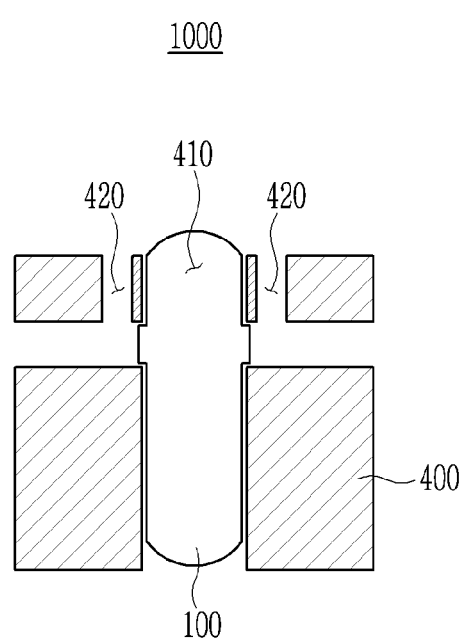

Next, referring to FIG. 5, the nuclear reactor pressure vessel 100 is separated from the biological shield concrete 400 (S300).

Specifically, the nuclear reactor pressure vessel 100 of which the pipes connected thereto are cut is separated from the biological shield concrete 400 through the enlarged upper space of the cavity 410 of the biological shield concrete 400.

In addition, since pipes connected with the reactor pressure vessel 100 are in the cut state through the upper penetration holes 420, the reactor pressure vessel 100 can be easily separated from the biological shield concrete 400 without interference between the biological shield concrete 400 and the pipes.

In addition, since pipes connected with the reactor pressure vessel 100 and a steam generator are in the cut state through the upper penetration holes 420, the steam generator can be easily separated from the biological shield concrete 400 without interference between the biological shield concrete 400 and the pipes.

As described, in the method for decommissioning the nuclear facility according to the exemplary embodiment, when the pipes 200 that are directly connected to the reactor pressure vessel 100 are cut, the pipes 200 are completely exposed in the width direction through the upper penetration holes 420 by separating the sandboxes 500 for determining integrity of the pipes 200 from the upper penetration holes 420 of the biological shield concrete 400, which are provided for determining integrity of the pipes 200, from the upper penetration holes 420 of the biological shield concrete 400 without forming separate holes in the biological shield concrete 400 such that a work space for cutting the pipes 200 can be assured, thereby easily cutting the pipes 200 connected with the nuclear reactor pressure vessel 100.

In addition, in the method for decommissioning the nuclear facility according to the exemplary embodiment, the pipes 200 disposed inside the biological shield concrete 400 are cut through the upper penetration holes 420 that are exposed by separating the sandboxes 500, and the nuclear reactor pressure vessel 100 and the steam generator are separated from the biological shield concrete 400 such that the decommission process time can be shortened by using the sandboxes 500 without performing separate work for decommissioning of the biological shield concrete 400.

That is, a method for decommissioning the nuclear facility that can reduce time for decommissioning the nuclear facility and cost for decommission by easily cutting the pipes 300 that are directly connected to the nuclear pressure vessel 100 and surrounded by the biological shield concrete 400 is provided.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A method for decommissioning a nuclear facility that includes a nuclear reactor pressure vessel, a plurality of pipes that are directly connected to the nuclear reactor pressure vessel, a biological shield concrete that surrounds the plurality of pipes and the nuclear pressure vessel and includes a plurality of upper penetration holes that overlap the plurality of pipes, and a plurality of sandboxes that cover the plurality of upper penetration holes, comprising:
    exposing the plurality of pipes through the plurality of upper penetration holes by removing the plurality of sandboxes; and
    cutting the plurality of pipes through the plurality of upper penetration holes,
    wherein:
    the exposing the plurality of upper penetration holes is carried out by removing a sealant that seals between the plurality of sandboxes and the upper portion of the biological shield concrete, and separating the plurality of sandboxes from the plurality of upper penetration holes.

2. The method for decommissioning the nuclear facility of claim 1, wherein the plurality of upper penetration holes expose the plurality of pipes across a diameter thereof.

3. The method for decommissioning the nuclear facility of claim 2, wherein the cutting the plurality of pipes is carried out by cutting the plurality of pipes across the diameter thereof using a wire saw or a circular saw.

4. The method for decommissioning the nuclear facility of claim 1, further comprising separating the nuclear pressure vessel from the biological shield concrete.

5. The method for decommissioning the nuclear facility of claim 1, wherein the nuclear reactor pressure vessel is a pressurized water reactor.

* * * * *